United States Patent [19]

Mallek

[11] 4,055,125

[45] Oct. 25, 1977

[54] INCINERATOR, ESPECIALLY FOR BURNING WASTE MATERIAL

[75] Inventor: Heinz Mallek, Linnich-Tetz, Germany

[73] Assignee: Kernforschungsanlage Julich Gesellschaft mit beschrankter Haftung, Julich, Germany

[21] Appl. No.: 679,912

[22] Filed: Apr. 26, 1976

[30] Foreign Application Priority Data

Apr. 24, 1975 Germany .............................. 2518128

[51] Int. Cl.² ............................ F23G 5/00; F23J 3/00
[52] U.S. Cl. ..................................... 110/8 R; 110/10; 110/119
[58] Field of Search ............... 110/119, 10, 8 R, 18 R

[56] References Cited

U.S. PATENT DOCUMENTS

| 3,722,433 | 3/1973 | Kramer | 110/119 |
| 3,807,324 | 4/1974 | Williamitis | 110/119 |
| 3,862,609 | 1/1975 | Eff | 110/119 |
| 3,922,974 | 12/1975 | Hemplemann | 110/119 |

Primary Examiner—Kenneth W. Sprague
Attorney, Agent, or Firm—Walter Becker

[57] ABSTRACT

An incinerator, especially for burning waste material with a device for purifying flue gases derived from a combustion chamber for burning the waste material. In the combustion chamber or adjacent thereto, discharge openings of conduit means are provided for conveying fresh air thereto. The device for purifying the flue gases comprises a filter of high heat-resistant material which is interposed between the combustion chamber and a flue.

4 Claims, 4 Drawing Figures

INCINERATOR, ESPECIALLY FOR BURNING WASTE MATERIAL

The present invention relates to an incinerator, especially for burning waste materials, which comprises a combustion chamber for the materials to be burned and a device serially following the combustion chamber for purifying the flue gases while in the combustion chamber there are provided conduit openings for feeding fresh air to the combustion chamber.

Incinerators, especially for burning waste materials, are used to materially reduce the volume of combustible waste materials of various compositions as they occur in households, office buildings and industry, as well as animal carcasses or clinical waste to thereby obtain sterile, possibly non-combustible residues. At the same time it is intended to purify the flue gases prior to releasing them into the atmosphere so that substances harmful for the environment will be eliminated.

It is well known in the art to have the combustion chamber of an incinerator followed by an installation for the purification of the flue gases in the form of, for instance, a cyclone, electronic filter, bag filter, candle filter, or devices in which the purification of the gases is effected by wet purification. In this connection there exists the great disadvantage that for these known purifying installations about the same number of structural elements is needed as for that part of the incinerator which is provided for the burning of the waste materials. It should be noted that these known purifying installations must be capable to absorb the maximum occurring quantity of waste materials. A further drawback of the above referred to known devices consists in that, when using the heretofore known purifying installations which follow the combustion chamber, it cannot be prevented that combustion residues will collect on the exchange surface of the heat exchangers or boilers in case means for the recovery of the waste heat are provided. This results in a reduction of the degree of efficiency of the waste heat recovery with increasing duration of the operation.

It is, therefore, an object of the present invention to provide an incinerator, especially for burning waste materials, with a device for purifying the flue gases, which device follows the combustion chamber provided for the materials to be burned.

More specifically, it is an object of the present invention to provide an incinerator as set forth in the preceding paragraph in which the flue gases are purified in a simple manner and without a great number of structural elements to such a degree that, without requiring a further purification, they can be released into the atmosphere.

It is a still further object of the present invention so to design the incinerator as set forth in the preceding paragraphs that the device which follows the combustion chamber for purifying the flue gases can easily be attended to and serviced.

Moreover, when a recovery of the waste heat is intended, it is another object of the present invention effectively to prevent the collection of combustion resides on the heat exchanging surfaces to thereby increase the economy of the waste heat recovery to a greater extent than was heretofore possible.

These and other objects and advantages of the invention will appear more clearly from the following specification in connection with the accompanying drawings, in which:

FIG. 1 diagrammatically illustrates an incinerator according to the invention with waste heat recovery and with a filter.

Figure 1:
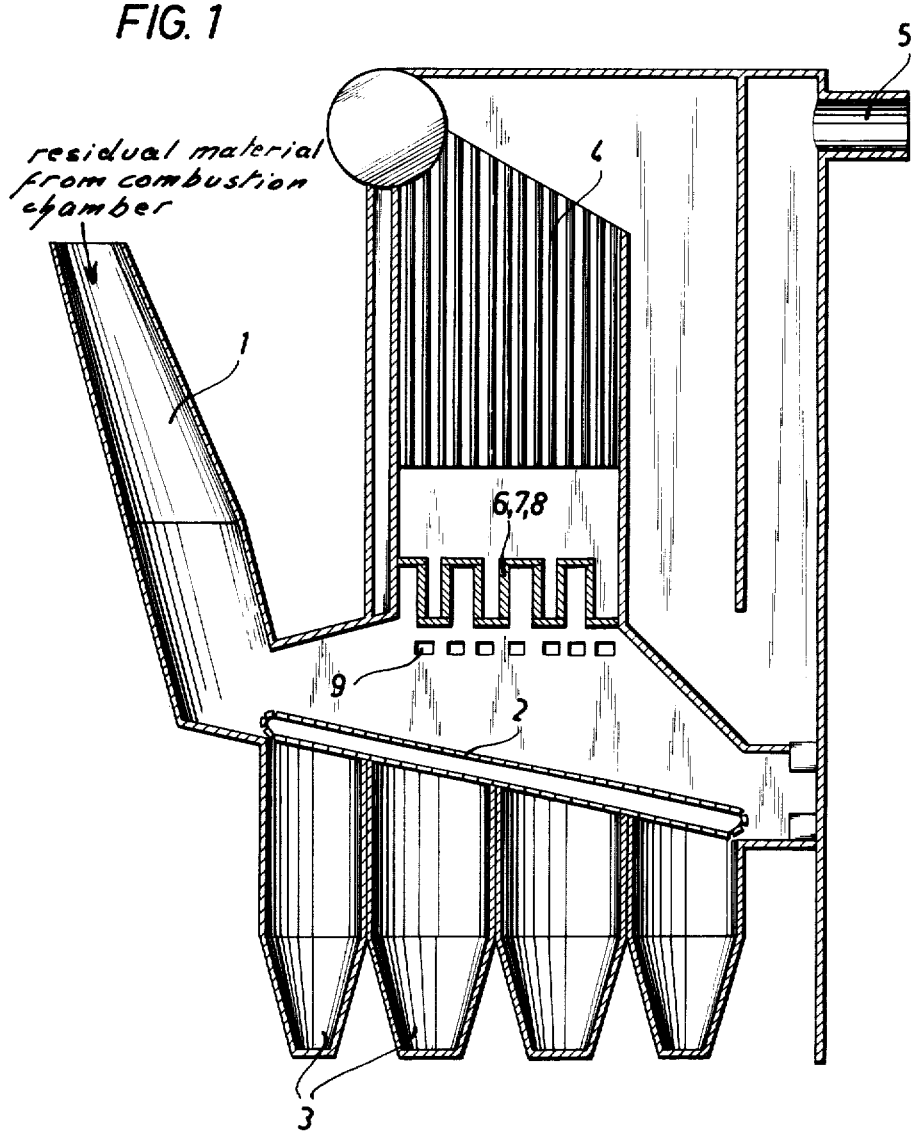

The incinerator according to the present invention is characterized primarily in that the device for purifying the flue gases comprises a filter of high heat resistant material which filter is provided at the exit of the combustion chamber for the hot flue gases and absorbs the ash and soot particles carried by the flue gases.

Due to the fact that with the incinerator according to the invention the filter is provided at the exit end of the combustion chamber, an effective filtering of the flue gases is realized. When a waste heat recovery is intended, the filter is accordingly located between the combustion chamber and that part of the plant which is intended for the recovery of the waste heat whereby a depositing of combustion residues on the heat exchanger surfaces of the plant section provided for the waste heat recovery will be prevented and consequently the efficiency of the waste heat recovery will be increased. Another advantage of the incinerator according to the invention consists in that the ash and soot particles which are retained by the filter remain in the still hot part of the incinerator so that a post-combustion of the ash particles will be realized. This effect is further improved by arranging the filter in the direct vicinity of the conduit openings provided for the feeding-in of fresh air. The conduit openings are so located that the fresh air intermixes with the flue gases flowing toward the filter.

It has proved particularly advantageous to build up the filter of a filter layer forming the filter surface and facing the oncoming flue gases while consisting of a gas permeable fabric or gas permeable solid body, and of a carrier member forming the holding means for the filter layer and having passages or holes therein while consisting of fire resistant material. In this way it is possible in a simple manner to renew the filters by exchanging the filter layers. In most instances of employment it is even expedient not to remove the filter layers in their entirety but to crush the filter layers and to let the thus produced fragments drop into the combustion chamber or directly into an ash silo following the combustion chamber from where they can be withdrawn together with the coarser combustion residues of the incinerator.

Materials suited for the filter layer are fibers of ceramic material or of high heat resistant materials, such as austenitic steel or the like. These fibers are expediently compressed into mats. As carrier member for the filter layer, there may be used, for instance, perforated plates of ceramic material or a framework made of high heat resistant steel. Experience has shown that the ash and soot particles are deposited onto the filter layers without clogging up the filter. The deposited particles themselves will form a firm filter layer which increases the effectiveness of the originally introduced filter layer and which with increasing duration of operation and after a sufficiently thick layer has been deposited will by themselves suffice for filtering the flue gases. The high heat resistant materials for the filter layers also include such materials which are fire resistant only until the ash layer acting as filter layer has been formed.

Referring now to the drawings in detail, the incinerator according to FIG. 1 with a device for recovering waste heat comprises a travelling grate 2 which is charged through a charging chute 1 with combustion residues from a combustion chamber not shown in FIG. 1. From the travelling grate 2 the combustion residues which are not carried away by the flue gases drop into the ash silos 3 provided below the travelling grate 2. The incinerator further comprises a boiler system 4 which is located above the travelling grate 2 and serves for recovering the waste heat. The flue gases are passed over the boiler system 4. From the boiler system 4, the flue gases then pass to the waste gas conduit 5 and from there through a flue not illustrated in FIG. 1 into a chimney (likewise not shown in FIG. 1). As indicated in FIG. 1, the device for purifying the flue gases, which is arranged above the travelling gate 2, comprises a filter with filter layers 6 and 7 (shown on an enlarged scale in FIG. 2). This device for purifying the flue gases is so arranged above the grate 2 that the flue gases which are formed during the combustion are passed through the filter prior to reaching the boiler system 4. As a result thereof, a depositing of combustion residues on the exchange surfaces of the boiler system 4 can for all practical purposes no longer occur. To assure a better post-combustion of the ash residues or particles retained by the filter, feeding lines 9 are provided for feeding fresh air to an area below the filter.

Figure 2:
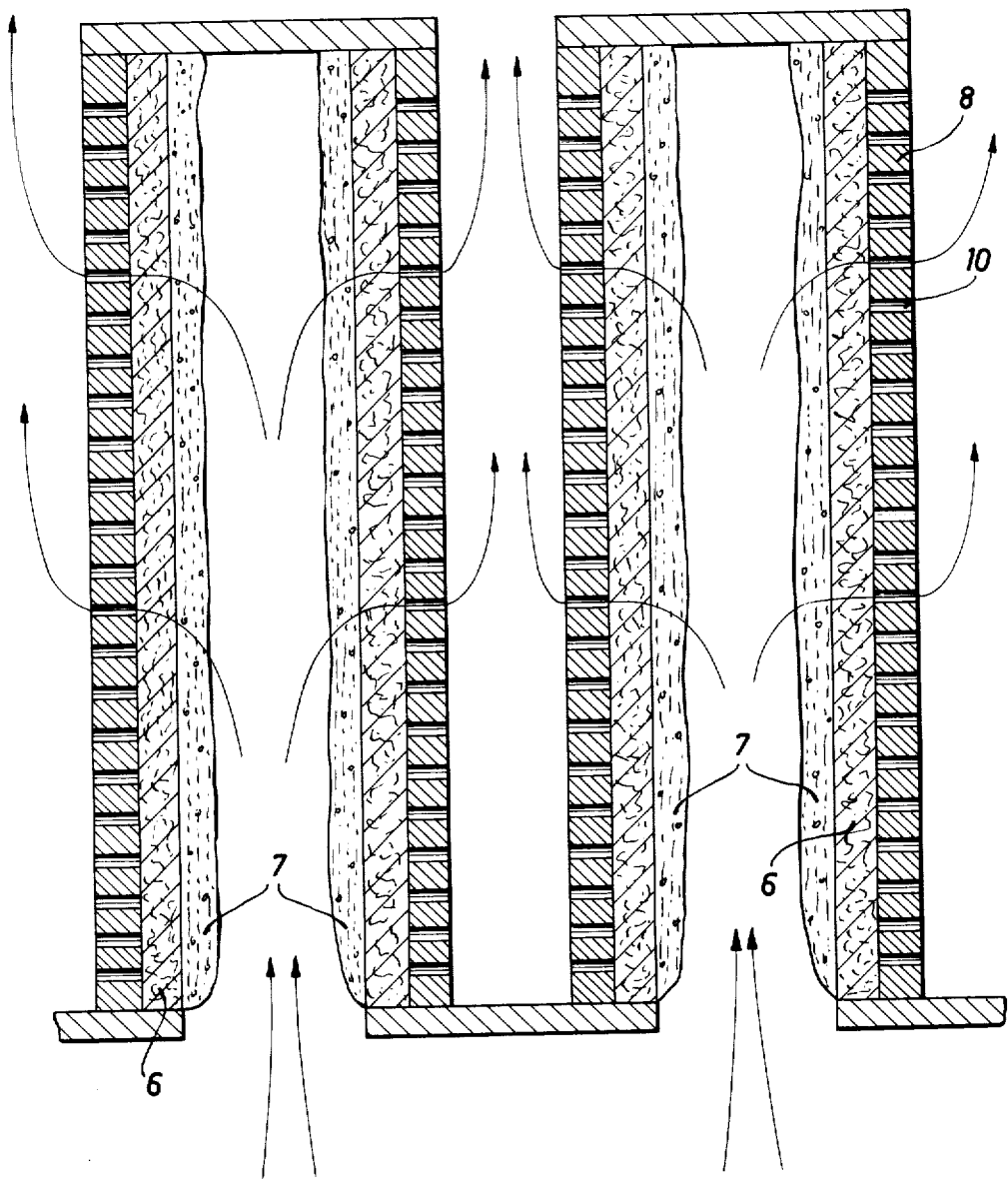
FIG. 2 represents a partial longitudinal section through a filter with plate-shaped parts arranged parallel to each other for use in connection with the incinerator of FIG. 1.

As will be evident from FIG. 2, the device for purifying the flue gases which, for instance with the incinerator of FIG. 1, follows the combustion chamber, comprises a filter with filter layers 6, the carrier elements 8 serving as holding means for the filter layers, and the filter layers formed after a certain period of operation by the deposited ash particles.

Figure 3:
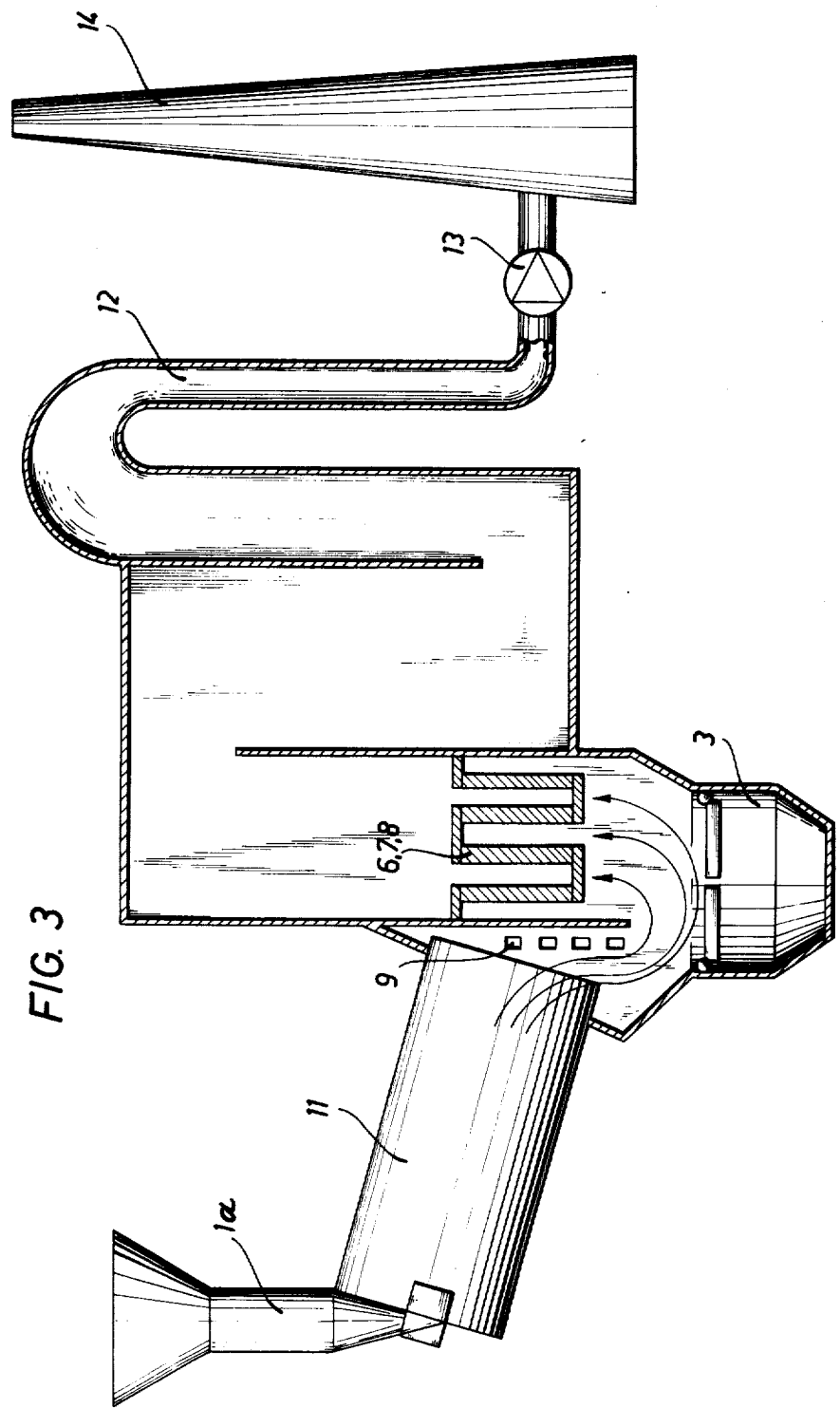
FIG. 3 illustrates an incinerator with a filter according to FIG. 2, the incinerator being designed as revolving tubular furnace.
Figure 4:
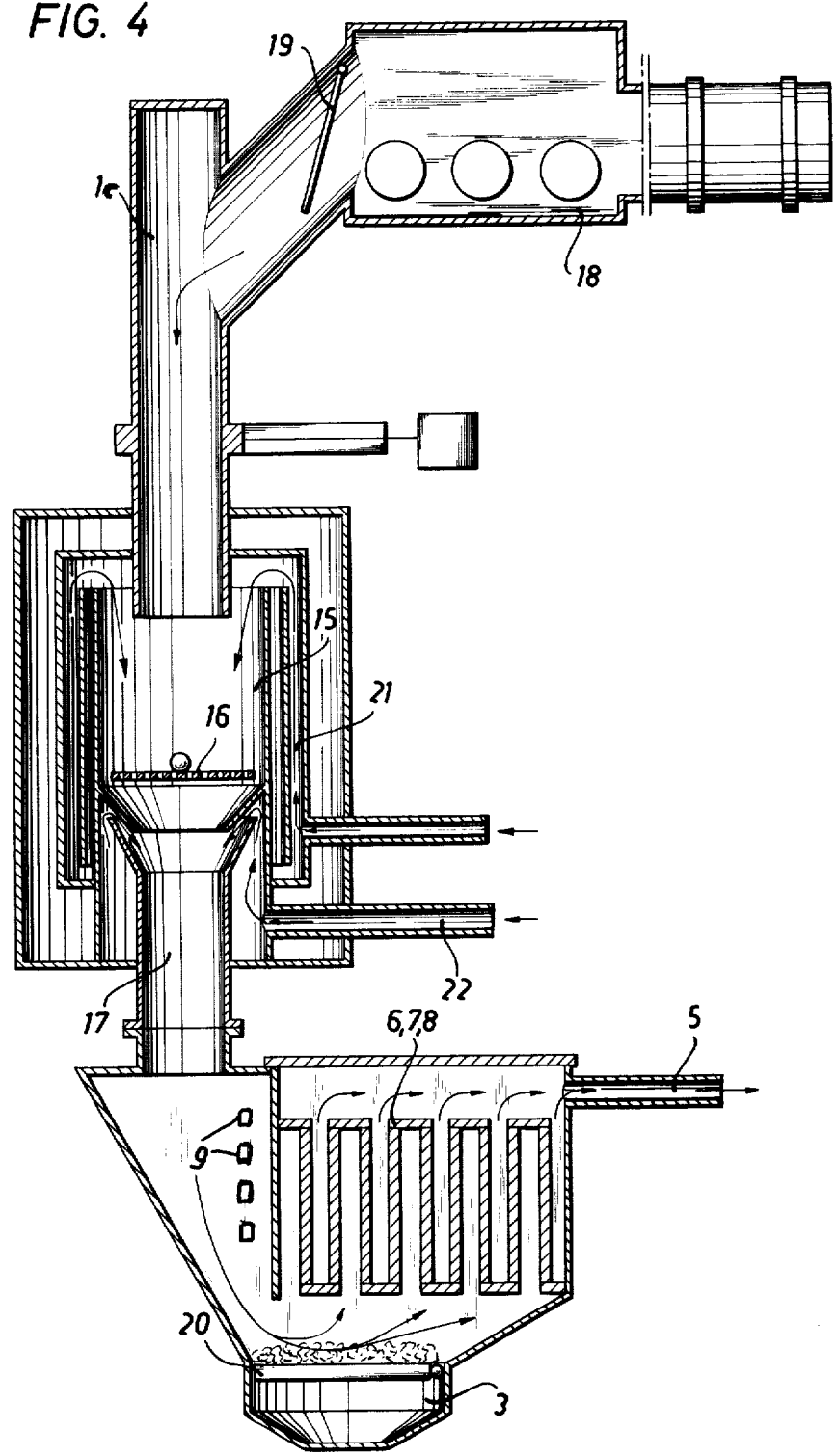
FIG. 4 is an incinerator with main combustion chamber and post-combustion chamber and with a filter according to FIG. 2.

As will be evident from FIG. 2, the carrier elements 8 provided with perforations or bores 10 are respectively so connected to each other that the flue gases, when applying the filter in the manner illustrated in FIGS. 1, 3 and 4, pass only in the direction of the arrow indicated in FIG. 2 through the oppositely located filter layers arranged in pairs. Due to this arrangement of the filter layers, there is achieved due to the thus obtained large filtering surface in a minimum of space a high filtering effect. The carrier elements 8 and the filter layers provided on the carrier elements 8 are (not illustrated in drawings) expediently designed in the form of plates and are arranged parallel to each other. In this way the filters can be renewed in a simple manner by inserting new plate-shaped filter layers after the old filter layers have been removed.

In order with the incinerators according to the invention as illustrated in FIGS. 1 and 3 to permit an easy handling of the filters, there is expediently provided an access to the filter (not illustrated in the drawings) which is located laterally of the filter and is adapted to be closed. If new filter layers have to be inserted, the old filter layers are by means of suitable tools merely crushed and the thus resulting pieces are allowed to drop into the ash silo or - with the incinerator according to FIG. 1 - are allowed to drop onto the travelling grate 2. The new filter layers are then merely inserted from the side into the holding means therefor.

The incinerator illustrated in FIG. 3 consists in a manner similar to that of FIG. 1 of a revolving tubular furnace 11 which can be charged through a filling chute 1a and includes a combustion chamber (not shown). From the furnace 11, the coarse combustion residues not carried away by the flue gases pass into the ash silo 3. The flue gases are passed through the filter of FIG. 2 comprising the filter layers 6 and 7 and the carrier elements 8 and are conveyed through a flue gas cooler 12 and an induced draft 13 into the chimney 14. As will be evident from the furnace shown in FIG. 3, the filter is arranged directly behind the outlet of the furnace and thus of the combustion chamber so that ash and soot particles which are carried by the flue gases remain in the still hot part of the incinerator whereby an effective post-combustion of the ash particles will be realized. For obtaining an improved combustion of the flue gases and for obtaining an optimum post-combustion of the ash particles retained in the filter, fresh air is, similar to the incinerator of FIG. 1, conveyed through feeding openings 9 provided at the exit of the combustion chamber.

The incinerator illustrated in FIG. 4 comprises a main combustion chamber 15, a post-combustion chamber 17 separated from the main combustion chamber 15 by a grate 16, and a filter according to FIG. 2 which follow the post-combustion chamber 17. The flue gases pass from this filter into the waste gase conduit 5 and from there through an induced draft (not illustrated in FIG. 4) into a chimney (likewise not shown in FIG. 4). As will be evident from FIG. 4, the combustible waste materials are through a charging box 18 charged into the charging chute 1c which is separated from the charging box 18 by a check flap 19. The coarser ash residues, which have passed through the grate 16 and are not carried by the flue gases to the filter, drop onto a bottom plate or floor 20 which is arranged below the filter and is adapted to be closed and after they have been burned and the bottom plate 20 has been opened pass into the ash silo 3. During the combustion, fresh air is introduced through the double-walled chamber 21 of the main combustion chamber 15 and through laterally arranged feeding conduits 22 into the post-combustion chamber 17. Similar to FIGS. 1 and 3, there may also be provided additional fresh air inlets 9 which in this instance would be adjacent the post-combustion chamber 17.

In an incinerator corresponding to the incinerator shown in FIG. 4, domestic waste materials with a heat value of about from 2500 to 3000 kcal/kg were burned at a through-put of 50 kg per hour. As filter layers 6 there were used filter mats of a thickness of from 10 to 15 mm and compressed out of fibers having a thickness of about 0.003 mm. The volumetric weight of these filter mats amounts to about 200 kg/m³. The fibers consist of about equal parts of $SoO_2$ and $Al_2O_3$. They were temperature resistant up to approximately 1500° C. As carrier elements 8 perforated plates of ceramic material were used. The temperature at the filter layers during operation amounted to from 900° to 950° C. The dust content of the gas leaving the filtering device according to the invention was less than 50 mg/m³N. After a period of operation of about 400 hours the incinerator was turned off and the filter layers 6 and 7 were changed. It was found that a nearly uniform layer of 12 mm thickness had built up. The original filter layer which was made of ceramic material was no longer recognizable.

It is, of course, to be understood that the present invention is, by no means, limited to the specific showing in the drawings but also comprises any modifications within the scope of the appended claims.

What I claim is:

1. An incinerator plant with a flue, especially for burning waste materials, which comprises combustion means including a combustion chamber for receiving and burning waste materials, conduit means associated with said combustion chamber for conveying fresh air therethrough, and purifying means for purifying flue gases derived from the combustion of waste materials, said purifying means including filter means of high heat resistant material in said combustion chamber so that deposited particles themselves form a solid filter layer and interposed directly between said combustion chamber and said flue.

2. An incinerator plant according to claim 1, in which said filter means is arranged directly in the immediate vicinity of said conduit means so that fresh air passed through said conduit means intermixed with flue gases flowing from said combustion chamber to said filter means.

3. An incinerator plant according to claim 2, in which said filter means comprises filter layer means formed of gas permable fabric forming the filtering surface and also comprises perforated holding means for supporting said filter layer means.

4. An incinerator plant according to claim 2, in which said filter means comprises filter layer means formed of gas permeable solid bodies forming the filtering surface and also comprises perforated holding means for supporting said filter layer means.

* * * * *